(12) United States Patent
Tang et al.

(10) Patent No.: US 12,443,190 B2
(45) Date of Patent: Oct. 14, 2025

(54) ROBOT TRAVELING METHOD, AND ELECTRONIC DEVICE

(71) Applicant: Jingdong Technology Information Technology Co., Ltd., Beijing (CN)

(72) Inventors: Enqiong Tang, Beijing (CN); Chao Wang, Beijing (CN); Xiujun Yao, Beijing (CN); Chenguang Gui, Beijing (CN)

(73) Assignee: Jingdong Technology Information Technology Co., Ltd., Beijing (CN)

( * ) Notice: Subject to any disclaimer, the term of this patent is extended or adjusted under 35 U.S.C. 154(b) by 93 days.

(21) Appl. No.: 18/037,174

(22) PCT Filed: Dec. 17, 2021

(86) PCT No.: PCT/CN2021/139330
§ 371 (c)(1),
(2) Date: May 16, 2023

(87) PCT Pub. No.: WO2022/179270
PCT Pub. Date: Sep. 1, 2022

(65) Prior Publication Data
US 2024/0004389 A1    Jan. 4, 2024

(30) Foreign Application Priority Data
Feb. 23, 2021    (CN) .......................... 202110204861.1

(51) Int. Cl.
G05D 1/00    (2024.01)
(52) U.S. Cl.
CPC ........... *G05D 1/0214* (2013.01); *G05D 1/024* (2013.01); *G05D 1/0274* (2013.01)
(58) Field of Classification Search
CPC .... G05D 1/0214; G05D 1/024; G05D 1/0274; G05D 2111/17; G05D 1/242;
(Continued)

(56) References Cited

U.S. PATENT DOCUMENTS

| 2011/0153139 A1* | 6/2011 | Erb | ....................... B66F 9/0755 |
| | | | 701/28 |
| 2013/0131908 A1* | 5/2013 | Trepagnier | ............ B60W 30/00 |
| | | | 701/1 |
| 2019/0294181 A1* | 9/2019 | Ohno | .................... G05D 1/0088 |

FOREIGN PATENT DOCUMENTS

| CN | 105955272 A | 9/2016 |
| CN | 108777935 A | 11/2018 |

(Continued)

OTHER PUBLICATIONS

PCT/CN2021/139330 International Search Report, Mar. 21, 2022.

*Primary Examiner* — Bao Long T Nguyen
(74) *Attorney, Agent, or Firm* — Lippes Mathias LLP (57) ABSTRACT

A robot traveling method, includes: detecting an obstacle, and obtaining first coordinate points of the obstacle in a first coordinate system which is a coordinate system of an obstacle detector; obtaining second coordinate points of the obstacle in a second coordinate system by performing coordinate system transformation on the first coordinate points, the second coordinate system being a coordinate system of a robot; obtaining a first azimuth corresponding to each second coordinate point, traversing all the first azimuths, and determining a farthest target coordinate point that the robot is allowed to reach when walking along a currently traversed first azimuth by performing coordinate axis rotation on all the second coordinate points based on the currently traversed first azimuth; and obtaining a target azimuth deviation of the robot based on the target coordinate point corresponding to each first azimuth, and controlling the robot to travel based on the target azimuth deviation.

18 Claims, 4 Drawing Sheets a                                    b (58) Field of Classification Search
CPC .......... G05D 2107/60; G05D 2109/12; G05D 1/246; G05D 1/622; G05D 1/0221; G05D 1/0242; G05D 1/0255; G05D 1/0276; G01C 21/20

See application file for complete search history.

(56) References Cited

FOREIGN PATENT DOCUMENTS

| | | |
|---|---|---|
| CN | 111552289 A | 8/2020 |
| CN | 112000090 A | 11/2020 |
| CN | 112987734 A | 6/2021 |
| JP | 2011238104 A | 11/2011 |
| WO | 2014064990 A1 | 5/2014 |
| WO | 2014103989 A1 | 7/2014 |

\* cited by examiner

ROBOT TRAVELING METHOD, AND ELECTRONIC DEVICE

CROSS REFERENCE TO RELATED APPLICATIONS

This application is a U.S. national phase of International Application No. PCT/CN2021/139330 filed on Dec. 17, 2021, which is based on and claims priority to Chinese patent application No. 202110204861.1, filed on Feb. 23, 2021, the entire contents of which are incorporated herein by reference.

TECHNICAL FIELD

The disclosure relates to the field of robotics, in particular to a robot traveling method, an electronic device, and a storage medium.

BACKGROUND

Planning path under complex terrain is one of the technical difficulties to be solved in the field of robot control. For inspection robots, some special areas in a machine room pose a greater challenge for the robot to travel, such as narrow passages.

SUMMARY

According to embodiments of a first aspect of the disclosure, a robot traveling method is provided. The method includes:
  detecting an obstacle, and obtaining first coordinate points of the detected obstacle in a first coordinate system, in which the first coordinate system is a coordinate system of an obstacle detector;
  obtaining second coordinate points of the obstacle in a second coordinate system by performing coordinate system transformation on the first coordinate points, in which the second coordinate system is a coordinate system of a robot;
  obtaining a first azimuth corresponding to each second coordinate point, traversing all the first azimuths, and determining a farthest target coordinate point that the robot is allowed to reach when the robot walks along a currently traversed first azimuth by performing coordinate axis rotation on all the second coordinate points based on the currently traversed first azimuth; and
  obtaining a target azimuth deviation of the robot based on the target coordinate point corresponding to each first azimuth, and controlling the robot to travel based on the target azimuth deviation.

To achieve the above purposes, embodiments of a second aspect of the disclosure provide an electronic device. The electronic device includes:
  at least one processor; and
  a memory communicatively connected to the at least one processor; in which
  the memory stores instructions executable by the at least one processor, and when the instructions are executed by the at least one processor, the at least one processor is caused to implement the robot traveling method according to the embodiment of the first aspect of the disclosure.

According to embodiments of a third aspect of the disclosure, a computer-readable storage medium having computer instructions stored thereon is provided. The computer instructions are configured to cause a computer to implement the robot traveling method according to the embodiment of the first aspect of the disclosure.

DETAILED DESCRIPTION

Embodiments of the disclosure will be described in detail below, and examples of embodiments are illustrated in the drawings, throughout which, the same or similar numerals represent the same or similar elements or elements having the same or similar functions. The embodiments described below with reference to the drawings are explanatory, serve to explain the disclosure, and are not construed to limit the disclosure.

In the related art, when traveling in a narrow passage, a forward path is planned firstly for the robot according to positioning information. However, in practice, environmental conditions and sensor errors can affect the positioning accuracy of the robot, so the security and accuracy of the robot traveling along the planned travel path are not high.

The disclosure aims to solve one of the technical problems in the related art at least to some extent. In view of this, a first object of the disclosure is to provide a robot traveling method, to compensate for the impact of environmental conditions and sensor errors on positioning accuracy of the robot when the robot is planning a path, and ensure safety and accuracy of the robot when driving in special areas such as narrow passages.

A second object of the disclosure is to provide a robot travel control apparatus.

A third object of the disclosure is to provide an electronic device.

A fourth object of the disclosure is to provide a non-transitory computer-readable storage medium.

A fifth object of the disclosure is to provide a computer program product.

A robot traveling method and a robot traveling apparatus according to the embodiments of the disclosure are described below with reference to the drawings.

Figure 1:
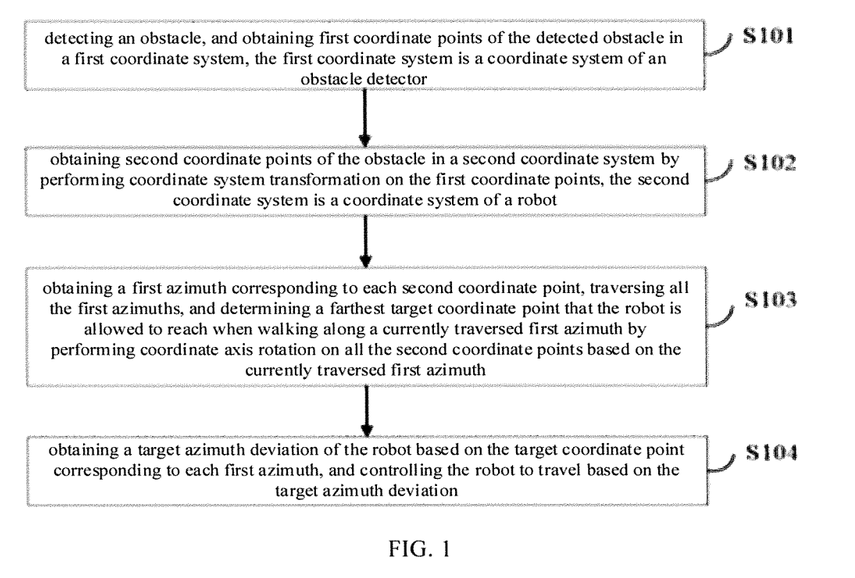
FIG. 1 is a flowchart of a robot traveling method according to an embodiment of the disclosure.

FIG. 1 is a flowchart of a robot traveling method according to an embodiment of the disclosure. As shown in FIG. 1, the robot traveling method includes following step S101 to step S104.

S101, an obstacle is detected, and first coordinate points of the detected obstacle in a first coordinate system are obtained, the first coordinate system is a coordinate system of an obstacle detector.

In an embodiment of the disclosure, the obstacle detector is provided at the front of the robot, the obstacle detector can detect whether there is an obstacle existing in the surroundings of the robot, to guide the robot to travel by avoiding obstacles. Optionally, the obstacle detector may include: a laser radar, an infrared distance measuring sensor, and an ultrasonic distance measuring sensor. The obstacle detector transmits a detection signal to a target from a certain angle, compares a signal reflected back from the target with the transmitted signal, to obtain time difference data between a transmitting time and a receiving time of the signals, and calculates a distance to the obstacle after processing by a signal processor.

Figure 2:
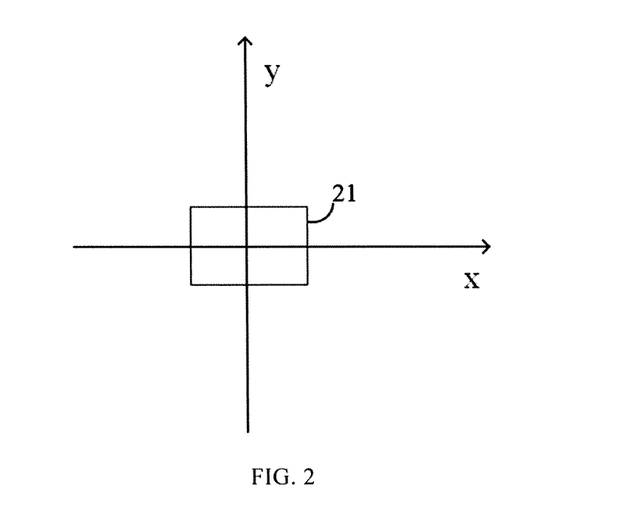
FIG. 2 is a schematic diagram of a coordinate system according to an embodiment of the disclosure.

For example, the obstacle detector is a laser radar, as shown in FIG. 2, FIG. 2 is a schematic diagram of a first coordinate system according to an embodiment of the disclosure. A geometric center of the laser radar is set as an origin, a direction directly in front of the robot 21 is used as a horizontal coordinate axis, i.e., x-axis, and a longitudinal coordinate axis is used as y-axis, to establish the coordinate system of the obstacle detector, i.e., the first coordinate system. The laser radar transmits detection signals from various azimuths, and each azimuth corresponds to a detection angle, to detect obstacles within a range of ±90°. The detection signal is reflected when encountering an obstacle, and the received signal reflected back from the obstacle is used to determine a distance to the obstacle, and then the first coordinate points of the obstacle in the first coordinate system can be determined.

An azimuth is an angle between a detection direction and the horizontal coordinate axis, and an interval between the various azimuths can be set. In an embodiment of the disclosure, for example, the interval is 1°, and a distance on azimuth $\theta_i$ (i=1, 2, 3, . . . , n) to the obstacle output by the laser radar is $r_i$ (i=1, 2, 3, . . . , n). A position coordinate $(x_i, y_i)$ of the obstacle in the coordinate system of the laser radar is obtained according to the distance to the obstacle, where (i=1, 2, 3, . . . , n), and the calculation way is as follows:
when $0° \leq \theta_i \leq 90°$, $x_i = r_i \sin(\theta_i)$ and $y_i = r_i \cos(\theta_i)$, and when $-90° \leq \theta_i < 0°$, $x_i = r_i \sin(\theta_i)$ and $y_i = -r_i \cos(\theta_i)$.

S102, second coordinate points of the obstacle in a second coordinate system are obtained by performing coordinate system transformation on the first coordinate points, in which the second coordinate system is a coordinate system of the robot.

The obstacle detector is taken as a reference point when detecting the distance, while the geometric center of the robot is taken as the reference point when controlling the robot to travel. Therefore, in order to achieve accurate control, the first coordinate points can be transformed to a local coordinate system of the robot, i.e., the second coordinate system, in embodiments of the disclosure. Therefore, a relative position between the obstacle and the geometric center can be obtained by means of the coordinate system transformation, to eliminate travel errors when the obstacle detector is used as a travel reference point.

In an embodiment of the disclosure, a position relation between a coordinate origin of the first coordinate system and a coordinate origin of the second coordinate system may include a distance and an orientation between the coordinate origins of the two coordinate systems. An offset of a first coordinate point between the two coordinate systems may be determined based on the position relation. A second coordinate point corresponding to the first coordinate point can be obtained by translating the first coordinate point based on the offset of the first coordinate point.

In an embodiment of the disclosure, the longitudinal coordinate axis is called the first coordinate axis, and the horizontal coordinate axis is called the second coordinate axis. For a chassis-driven robot, for example, a geometric center of the chassis of the robot is used as the coordinate origin, and a direction directly in front of the robot is used as the second coordinate axis, to determine the coordinate system of the robot itself, i.e., the second coordinate system. In order to take into account the environment on both sides of the robot, the obstacle detector is often located in the middle of the robot. Optionally, the obstacle detector is fixedly connected to the robot and mounted along a central axis of the robot, and the rotation of the robot may drive the obstacle detector to rotate simultaneously. That is, horizontal coordinate axes of the obstacle detector and the robot are the same, i.e., the geometric center point of the obstacle detector and the geometric center point of the chassis are located on the central axis. It should be noted that different robot shapes correspond to different geometric center points. For example, the robot is a foot-like robot and the geometric center point is in the torso region.

The obstacle detector is fixedly connected to the robot, thus, the distance between the obstacle detector and the robot is fixed, i.e., a distance between the geometric center point of the obstacle detector and the geometric center point of the chassis is fixed. In implementation, this distance can be stored in advance in a system of the robot.

It is known that the distance between the origin of the second coordinate system and the origin of the first coordinate system is z. Since the origin of the first coordinate system and the origin of the second coordinate system are in the central axis, the first coordinate points in the first coordinate system are translated to obtain the position coordinate $(x'_i, y'_i)$ of the obstacle in the second coordinate system, (i=1, 2, 3, . . . , n), in which $x'_i = x_i - z$, and $y'_i = y_i$. The offsets of the two coordinate axes are z and 0, respectively.

All the coordinates of each obstacle in the second coordinate system are obtained, and a 2D obstacle map can be generated, which represents all obstacles that can be detected by the obstacle detector within a range of ±90° in front of the robot.

S103, a first azimuth corresponding to each second coordinate point is obtained, all the first azimuths are traversed, and a farthest target coordinate point that the robot is allowed to reach when the robot walks along the currently traversed first azimuth is determined by performing coordinate axis rotation on all the second coordinate points based on the currently traversed first azimuth.

In an embodiment of the disclosure, each of the second coordinate points generated by the coordinate system transformation correspond to a first azimuth, and an angle between the second coordinate point and the horizontal coordinate axis is the first azimuth.

Taking one of the first azimuths as an example for illustration, when the robot walks along one of the first azimuths, the body of the robot tends to collide with a certain second coordinate point located near the first azimuth under a constraint of the body of the robot. After the collision, the robot no longer continues to walk along the first azimuth. In an embodiment of the disclosure, the second coordinate point with which the robot tends to collide is referred to as the farthest target coordinate point allowed to be reached when walking along the first azimuth.

There is an angle between the target coordinate point and the horizontal coordinate axis in implementation, in order to simplify the process of acquiring the target coordinate point, all the second coordinate points can be rotated according to the first azimuth, and then the second coordinate point that is near the first azimuth and collides with the robot is rotated to locations near the horizontal coordinate axis. Based on an axis rotation transformation formula, a coordinate value of the target coordinate point can be determined.

Figure 3:
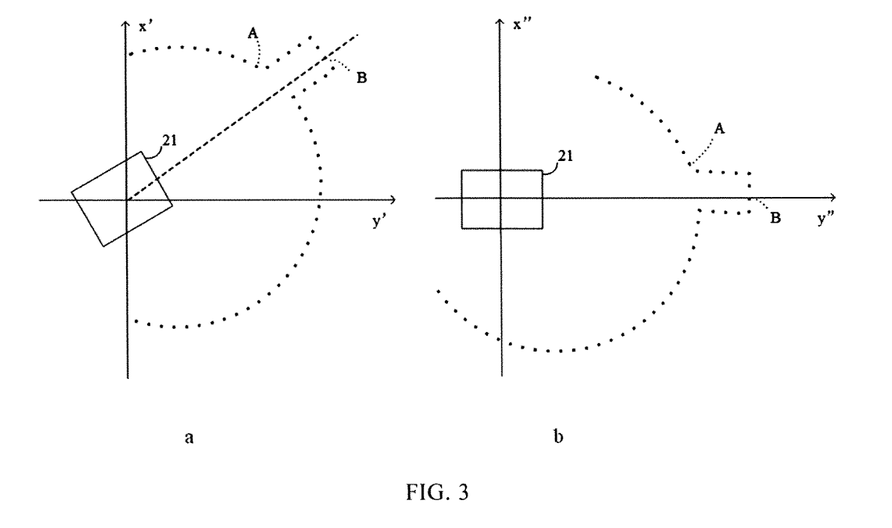
FIG. 3 is a schematic diagram of a second coordinate point after rotation according to an embodiment of the disclosure.

As shown in FIG. 3a, in an embodiment of the disclosure, when the robot travels along the first azimuth θ, the robot can travel as far as a point B if there is no obstruction. In practice, the robot often comes into contact with a coordinate point A during traveling due to some limitations such as a limitation of the body of the robot, at this time, the robot is not able to continue to travel forward, and this point A is the farthest target coordinate point that the robot is capable to reach along the first azimuth θ. As shown in FIG. 3b, by rotating clockwise −θ along the first azimuth θ, the point B can be rotated to the horizontal coordinate axis and the point A is rotated to near the axis, the coordinate value of the second coordinate point A after the rotation is determined according to the coordinate axis transformation formula.

S104, a target azimuth deviation of the robot is obtained based on the target coordinate point corresponding to each first azimuth, and the robot is controlled to travel based on the target azimuth deviation.

After traversing all the first azimuths, all the target coordinate points that the robot can reach in the range of ±90° are obtained. In order to ensure that the robot walks on the midline of the narrow passage, in an embodiment of the disclosure, the first azimuth is taken as a boundary to find out the target coordinate points on both sides of the robot that are closest to the driving passage, so as to obtain the target azimuth deviation of the robot. The robot is controlled to travel on the midline of the narrow passage according to the target azimuth deviation. Optionally, a target driving angle can be obtained by adding this deviation to a current driving angle or subtracting this deviation from the current driving angle, and then the robot is controlled to travel according to this target driving angle, to avoid encountering obstacles.

With the robot traveling method proposed in the embodiment of the disclosure, firstly, obstacle detection is performed from various azimuths, the coordinate points of the obstacle in the second coordinate system of the robot are determined through coordinate system transformation, and then the azimuth corresponding to each coordinate point is traversed to find the farthest target coordinate point that is reached by the robot when walking along the current azimuth, and then the target orientation deviation of the robot is obtained, and the robot is controlled to travel. In the embodiments of the disclosure, the position of the obstacle is determined by the obstacle detector, the farthest target coordinate point and the target orientation deviation of the robot are determined, to control the robot to travel. Therefore, directional guidance can be provided to the robot without the need for positioning information, and the robot is controlled to walk along the midline of the narrow passage, which effectively improves the robustness of the robot for safe passage in the narrow passage and avoids the impact of positioning errors on the robot's travel effect.

Figure 4:
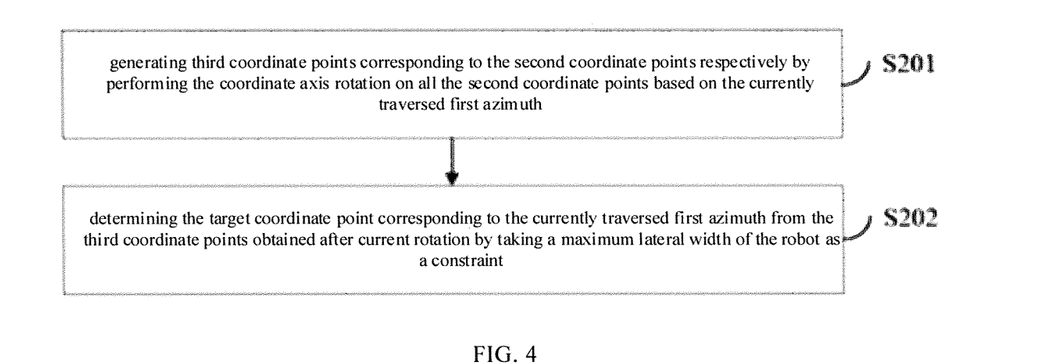
FIG. 4 is a flowchart of a robot traveling method according to an embodiment of the disclosure.

FIG. 4 is a flowchart of a robot traveling method according to an embodiment of the disclosure. As shown in FIG. 4, on the basis of the above embodiments, step S103 may include steps S201 to S202.

S201, third coordinate points corresponding to the second coordinate points respectively are generated by performing the coordinate axis rotation on all the second coordinate points based on the currently traversed first azimuth.

In an embodiment of the disclosure, the horizontal coordinate axis can be referred to as the second coordinate axis, and the longitudinal coordinate axis is the first coordinate axis. A first azimuth corresponding to any second coordinate point $(x'_i, y'_i)$ in the second coordinate system is obtained, and the first azimuth is an angle between the second coordinate point and the second coordinate axis, i.e., the x-axis. As shown in FIG. 3, taking the second coordinate point B as an example, the first azimuth of this second coordinate point B is θ.

The size corresponds to any second coordinate point $(x'_i, y'_i)$ in the second coordinate system is $\theta_i = \arctan(y'_i/x'_i)$, (i=1, 2, 3, ..., n).

In an embodiment of the disclosure, the first azimuth of each second coordinate point $(x'_i, y'_i)$ is used as a rotation angle, thus, a set of rotation angles can be generated. The azimuths are traversed according to the order of the first azimuths in the set. For each currently traversed first azimuth, the coordinate axis rotation is performed on all the second coordinate points in the second coordinate system according to that first azimuth coordinate system, and correspondingly, each second coordinate point may correspond to a coordinate point in a rotated coordinate system, i.e., a third coordinate point $(x''_{ij}, y''_{ij})$.

Starting from the first azimuth $\theta_0$, all the second coordinate points $(x'_i, y'_i)$ in the second coordinate system are rotated clockwise in an angle of $-\theta_0$, and the third coordinate point $(x''_{ij}, y''_{ij})$ corresponding to each second coordinate point after the rotation is calculated according to the following formulas:

$$x''_{ij} = x'_j \cos \theta_0 + y'_j \sin \theta_0 \ (j=1,2,3,\ldots,n); \text{ and}$$

$$y''_{ij} = y'_j \cos \theta_0 - x'_j \sin \theta_0 \ (j=1,2,3,\ldots,n).$$

S202, the target coordinate point corresponding to the currently traversed first azimuth is determined from the third coordinate points obtained after current rotation by taking a maximum lateral width of the robot as a constraint.

The robot is generally limited by the maximum lateral width of the robot during travel, for example, the robot cannot pass if the passage width is narrow. In some implementations, candidate third coordinate points whose absolute value of a first coordinate value is less than the maximum lateral width are obtained from the third coordinate points generated after rotation. The first coordinate value is a coordinate value on a first coordinate axis, i.e., the y-axis. That is, from the third coordinate points, coordinate points that satisfy a condition $|y''_{ij}| < w$ are selected as the candidate third coordinate points. If the condition $|y''_{ij}| < w$ is satisfied, it means that the width of the body of the robot is greater than the coordinate value on the y-axis, i.e., the robot cannot pass the candidate third coordinate points when traveling forward.

A coordinate point with a minimum second coordinate value is selected from the candidate third coordinate points as the target coordinate point, and the second coordinate value is a coordinate value on the second coordinate axis, i.e., the x-axis. In implementation, since all the candidate third coordinate points ahead are impassable, accordingly, the robot can only reach the coordinate point with the smallest x-axis coordinate value among the candidate third coordinate points, and other candidate third coordinate points are even more difficult to be reached by the robot. Therefore, the coordinate point $x''_{ij} = \min(x''_{ij} \ (i=1, 2, 3, \ldots, n))$ is selected as the target coordinate point, which is noted as $(x_{a0}, y_{a0})$. The w represents the lateral width of the robot, and min(•) represents a minimum value in the brackets. The above steps are repeated as changing the value of $\theta_0$ sequentially to $\theta_n$, to obtain the set of target coordinate points $(x_{ai}, y_{ai})$, which is a re-established obstacle map. That is, all the second coordinate points $(x'_i, y'_i)$ in the second coordinate system are rotated clockwise by $-\theta_1, -\theta_2 \ldots -\theta_n$ sequentially, and each of the second coordinate points has a corresponding third coordinate point $(x''_{ij}, y''_{ij})$ after each rotation, and the respective target coordinate points are obtained from the third coordinate points, to obtain the farthest target coordinate point that can be reached for each first azimuth.

In the embodiments of the disclosure, the coordinate axis rotation is performed on the second coordinate points in the second coordinate system, to obtain the farthest target coordinate point that the robot can reach when traveling along the azimuth of each second coordinate point. In the process of guiding the robot to travel based on the target coordinate point on each azimuth, the traveling process of the robot may be safer and more accurate.

Based on the above embodiments, the target coordinate points are obtained to better guide the robot to travel, thus a navigation map can be generated based on the target coordinate point corresponding to each first azimuth. Since each second coordinate point corresponds to a target coordinate point, the navigation map consisting of the target coordinate points can be re-established in the second coordinate system. Since this navigation map contains the optimal coordinate points that the robot is allowed to reach, the robot can be guided to travel according to this navigation map, thereby avoiding the risk of the robot driving deviation or collision with obstacles.

Figure 5:
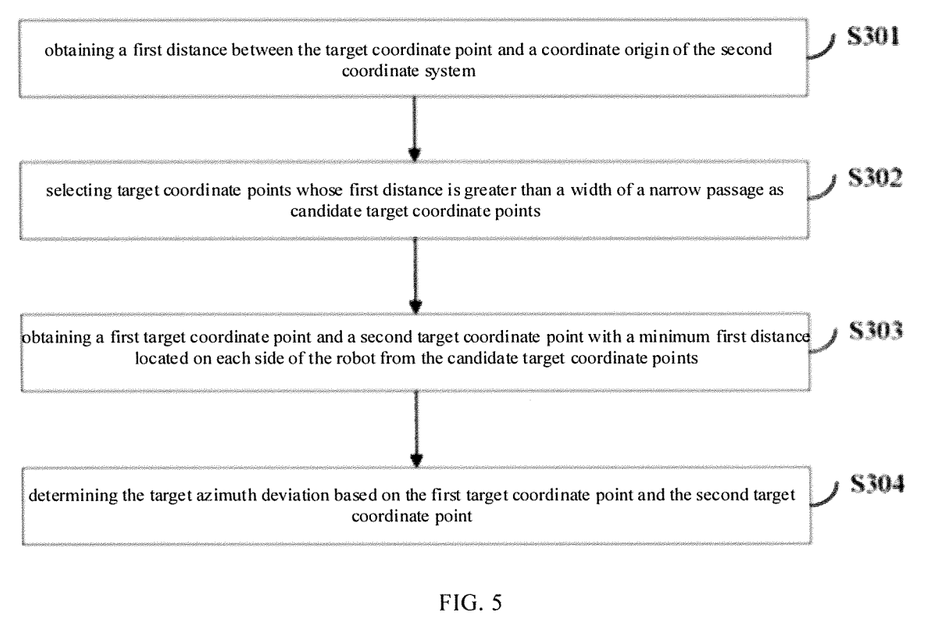
FIG. 5 is a flowchart of a robot traveling method according to an embodiment of the disclosure.

FIG. 5 is a flowchart of a robot traveling method according to an embodiment of the disclosure. As shown in FIG. 5, on the basis of the above embodiments, step S104 may include step S301 to step S304.

S301, a first distance between the target coordinate point and a coordinate origin of the second coordinate system is obtained.

For any target coordinate point $(x_{ai}, y_{ai})$, the distance between the point and the coordinate origin of the second coordinate system can be determined based on coordinate values of the target coordinate point $(x_{ai}, y_{ai})$. Optionally, the distance $d_i$ between the target coordinate point and the coordinate origin is obtained based on the following formula:

$$d_i = \sqrt{x_{ai}^2 + y_{ai}^2}.$$

S302, target coordinate points whose first distance is greater than a width of a narrow passage are selected as candidate target coordinate points.

The robot walks in a narrow passage, and coordinate points in front of the robot are coordinate points to be passed by the robot, which are often greater than the width of the narrow passage, and coordinate points located near the robot are coordinate points passing by or have passed by the robot. In an embodiment of the disclosure, the target coordinate points that is to be passed in front are selected based on the width of the narrow passage, i.e., all target coordinate points that satisfy a condition $d_i > h$ are screened out as the candidate target coordinate points, i.e., $(x_{aj}, y_{aj})$, where h is the width of the narrow passage. In the implementation, the width of the narrow passage is fixed and can be stored in advance in the robot's system.

S303, a first target coordinate point and a second target coordinate point with a smallest first distance located on each side of the robot are obtained from the candidate target coordinate points.

In an embodiment of the disclosure, the two points closest to the robot are selected from the candidate target coordinate points, i.e., the two closest points located on the two sides of the robot respectively. Optionally, the candidate target coordinate points are divided into two groups by using the azimuths of the candidate target coordinate points as a boundary. Generally, the azimuths of the points located on the two sides of the robot are in different angle ranges, so the candidate target coordinate points can be divided into two groups. For example, azimuths of some candidate target coordinate points are within 0° to 90°, and azimuths of some other candidate target coordinate points are within −90° to 0°, so the candidate target coordinate points can be divided into two intervals. The angle interval can be set flexibly, for example, it can be set as 0° to 90° and 90° to 180°.

By comparing the first distances $d_i$ of the candidate target coordinate points located on the two sides of the robot, the candidate target coordinate points $(x_{ak}, y_{ak})$ and $(x_{am}, y_{am})$ with the smallest first distance respectively in the two groups are obtained, which are the first target coordinate point and the second target coordinate point.

S304, the target azimuth deviation is determined based on the first target coordinate point and the second target coordinate point.

In some implementations, a second azimuth corresponding to the first target coordinate point and a second azimuth corresponding to the second target coordinate point are obtained. Optionally, the respective second azimuths are obtained based on the coordinate values of the first target coordinate point and the second target coordinate point respectively. In order to ensure that the robot walks on the midline of the narrow passage, average operation may be performed on the two second azimuths, i.e., an average value of the two second azimuths is obtained, and the average value is determined as the target azimuth deviation of the robot.

For example, the first target coordinate point and the second target coordinate point correspond to the second azimuths $\beta_k$ and $\beta_m$, respectively, and the target azimuth deviation of the robot is $\alpha = (\beta_k + \beta_m)/2$.

The two target coordinate points are the target coordinate points nearest to the robot in the current travel, i.e., these two target coordinate points are the obstacles to be considered firstly by the robot currently, thus, the target azimuth deviation obtained based on the second azimuths of the first target coordinate point and the second target coordinate point is a current optimal motion azimuth deviation of the robot. That is, the optimal motion azimuth deviation is used as an angle reference for rotation control of the chassis of the robot. The optimal motion azimuth deviation is the average value of the two second azimuths, therefore, the robot can walk in the middle of the two target coordinate points, that is, the motion direction of the robot in the narrow passage can always be kept near the middle line, so as to achieve the purpose of traveling in the middle of passage.

On the basis of the above embodiments, after obtaining the target azimuth deviation, the target azimuth deviation can be used as a basis to guide the robot to travel. Optionally, a motion azimuth of the robot at a previous moment is obtained, and the motion azimuth of the robot is adjusted according to the target azimuth deviation, to obtain a target motion azimuth of the robot at the current moment. After the target motion azimuth is obtained, the robot can be controlled to drive according to the target motion azimuth. In an embodiment of the disclosure, the optimal motion azimuth deviation is determined as the angle reference for rotation control of the chassis of the robot, the motion direction of the robot in the narrow passage is always maintained near the middle line, thereby achieving the purpose of traveling in the middle of passage.

Figure 6:
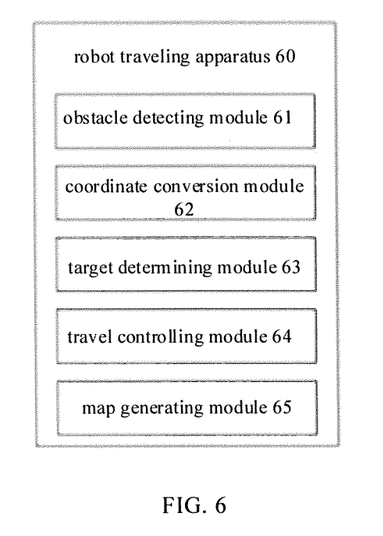
FIG. 6 is a block diagram of a robot travel apparatus according to an embodiment of the disclosure.

As shown in FIG. 6, based on the same application concept, the embodiments of the disclosure also provide an apparatus 60 for controlling robot travel. The apparatus 60 includes: an obstacle detecting module 61, a coordinate transformation module 62, a target determining module 63, and a travel controlling module 64.

The obstacle detecting module 61 is configured to detect an obstacle, and obtain first coordinate points of the detected obstacle in a first coordinate system, in which the first coordinate system is a coordinate system of an obstacle detector.

The coordinate transformation module 62 is configured to obtain second coordinate points of the obstacle in a second coordinate system by performing coordinate system transformation on the first coordinate points, in which the second coordinate system is a coordinate system of a robot.

The target determining module 63 is configured to obtain a first azimuth corresponding to each second coordinate point, traverse all the first azimuths, and determine a farthest target coordinate point that the robot is allowed to reach when the robot walks along a currently traversed first azimuth by performing coordinate axis rotation on all the second coordinate points based on the currently traversed first azimuth.

The travel controlling module 64 is configured to obtain a target azimuth deviation of the robot based on the target coordinate point corresponding to each first azimuth, and control the robot to travel based on the target azimuth deviation.

In some implementations, the target determining module 63 is further configured to: generate third coordinate points corresponding to the second coordinate points respectively by performing the coordinate axis rotation on all the second coordinate points based on the currently traversed first azimuth; and determine the target coordinate point corresponding to the currently traversed first azimuth from the third coordinate points obtained after current rotation by taking a maximum lateral width of the robot as a constraint.

In some implementations, the target determining module 63 is further configured to: obtain candidate third coordinate points whose absolute value of a first coordinate value is less than the maximum lateral width from the third coordinate points generated after the rotation, in which the first coordinate value is a coordinate value on a first coordinate axis; and select a coordinate point with a minimum second coordinate value from the candidate third coordinate points as the target coordinate point, in which the second coordinate value is a coordinate value on a second coordinate axis.

In some implementations, the apparatus 60 further includes: a map generating module 65, configured to generate a navigation map based on the target coordinate point corresponding to each first azimuth.

In some implementations, the travel controlling module 64 is further configured to: obtain a first distance between the target coordinate point and a coordinate origin of the second coordinate system; select target coordinate points whose first distance is greater than a width of a narrow passage as candidate target coordinate points; obtain a first target coordinate point and a second target coordinate point with a minimum first distance located on each side of the robot from the candidate target coordinate points; and determine the target azimuth deviation based on the first target coordinate point and the second target coordinate point.

In some implementations, the travel controlling module 64 is further configured to: obtain a second azimuth corresponding to the first target coordinate point and a second azimuth corresponding to the second target coordinate point; and obtain an average value of the two second azimuths as the target azimuth deviation.

In some implementations, the coordinate transformation module 62 is further configured to: obtain a position relation between a geometric center point of the obstacle detector and a geometric center point of the robot; obtain, based on the position relation, a first offset on the first coordinate axis and a second offset on the second coordinate axis of each first coordinate point; and for each of the first coordinate points, obtain a second coordinate point by performing translation and transformation on the first coordinate point based on the first offset and the second offset.

In some implementations, the travel controlling module 64 is further configured to: obtain a target motion azimuth by adjusting a motion azimuth of the robot based on the target azimuth deviation; and control the robot to travel based on the target motion azimuth.

Based on the same inventive concept, the embodiments of the disclosure further provide an electronic device.

Figure 7:
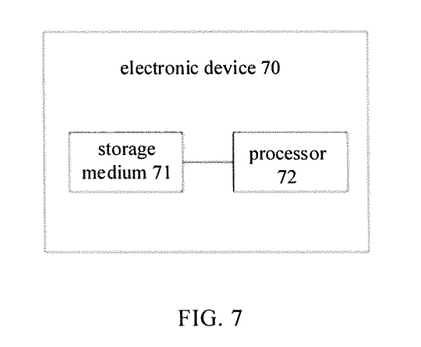
FIG. 7 is a schematic diagram of an electronic device according to an embodiment of the disclosure.

FIG. 7 is a schematic diagram of an electronic device according to an embodiment of the disclosure. As shown in FIG. 7, the electronic device 70 includes: a storage medium 71, a processor 72 and a computer program product stored on the memory 71 and executable on the processor 72. When the computer programs are executed by the processor, the above method for controlling robot travel is implemented.

Those skilled in the art should understand that the embodiments of the disclosure may be provided as a method, a system, or a computer program product. Therefore, the disclosure may adopt an entirely hardware embodiment, an entirely software embodiment, or an embodiment combining software and hardware aspects. The disclosure may use a form of a computer program product implemented on one or more computer-usable storage mediums (including, but not limited to, disk memory, CD-ROM, and optical memory) having computer-usable program codes stored therein.

The disclosure is described with reference to flowcharts and/or block diagrams of methods, devices (systems), and computer program products according to the embodiments of the disclosure. It is understood that each process and/or box in the flowcharts and/or block diagrams, and a combination of processes and/or boxes in the flowcharts and/or block diagrams, may be implemented by computer program instructions. These computer program instructions may be provided to a processor of a general computer, a specialized computer, an embedded processor, or other programmable data processing devices to produce a machine, so that instructions executed by a processor of a computer or other programmable data processing devices produce a device for implementing functions specified in one or more processes of a flowchart and/or one or more boxes of a block diagram.

These computer program instructions may also be stored in a computer-readable memory capable of directing a computer or other programmable data processing devices to operate in a particular manner, such that the instructions stored in such computer-readable memory produce an article of manufacture including an instruction device that implements the function specified in one or more processes of a flowchart and/or one or more boxes of a block diagram.

These computer program instructions may also be loaded onto a computer or other programmable data processing devices, such that a series of operation steps are executed on the computer or other programmable devices to produce processes implemented by the computer, such that the instructions executed on the computer or other programmable devices provide steps for implementing the functions specified in one or more processes of a flowchart and/or one or more boxes of a block diagram.

Based on the same inventive concept, the embodiment of the disclosure also provides a computer-readable storage medium having computer instructions stored thereon, and the computer instructions are used to cause a computer to implement the robot travelling method of the above-described embodiments.

Based on the same inventive concept, the embodiment of the disclosure also provides a computer program product including computer programs. When the computer programs are executed by a processor, the robot travelling method of the above-described embodiments is implemented.

It should be noted that in the claims, any reference symbols located between the brackets should not be constructed to limit the claims. The term "comprising" does not exclude components or steps not listed in the claims. The term "one" or "a" before a component does not exclude the existence of multiple such components. The disclosure may be implemented with the aid of hardware including several different components and an appropriately-programmed computer. In a unit claim listing multiple devices, several of these devices may be specifically embodied by the same hardware item. The use of the terms "first", "second", and "third" does not indicate any order. The terms may be interpreted as names.

In addition, the terms "first" and "second" are used for description purpose only and are not to be construed as indicating or implying relative importance or implicitly specifying the number of technical features indicated. Therefore, the features qualified with "first" and "second" may explicitly or implicitly include one or more such features. In the description of this disclosure, "a plurality of" means two or more, unless otherwise expressly and specifically limited.

Although preferred embodiments of the disclosure have been described, those skilled in the art may make additional changes and modifications to these embodiments once the basic inventive concepts are known. Therefore, the appended claims are intended to be construed to include the preferred embodiments and all changes and modifications that fall within the scope of the disclosure.

Obviously, those skilled in the art can make various changes and variations to this disclosure without departing from the spirit and scope of this disclosure. Therefore, if these modifications and variations of this disclosure are within the scope of the claims of this disclosure and its equivalent technology, this disclosure is also intended to include these modifications and variations.

What is claimed is:

1. A robot traveling method, operated in a scenario lacking positioning information, comprising:
    detecting an obstacle, and obtaining first coordinate points of the detected obstacle in a first coordinate system, wherein the first coordinate system is a coordinate system of an obstacle detector, the obstacle detector is used for detecting whether there is an obstacle existing in the surroundings of the robot and guiding the robot to travel by avoiding obstacles;
    obtaining second coordinate points of the obstacle in a second coordinate system by performing coordinate system transformation on the first coordinate points, wherein the second coordinate system is a coordinate system of a robot;
    obtaining a first azimuth corresponding to each second coordinate point, traversing all the first azimuths, and determining a farthest target coordinate point that the robot is allowed to reach when the robot walks along a currently traversed first azimuth by performing coordinate axis rotation on all the second coordinate points based on the currently traversed first azimuth, wherein the farthest target coordinate point is a farthest coordinate point of contact with an obstacle that the robot is capable to reach along the first azimuth due to a limitation of a body of the robot; and
    obtaining a target azimuth deviation of the robot based on the target coordinate point corresponding to each first azimuth, and controlling the robot to travel based on the target azimuth deviation;
    wherein obtaining the second coordinate points of the obstacle in the second coordinate system by performing the coordinate system transformation on the first coordinate points, comprises:
    obtaining a position relation between a geometric center point of the obstacle detector and a geometric center point of the robot;
    obtaining, based on the position relation, a first offset on the first coordinate axis and a second offset on the second coordinate axis of each first coordinate point; and
    for each of the first coordinate points, obtaining a second coordinate point by performing translation and transformation on the first coordinate point based on the first offset and the second offset.

2. The method of claim 1, wherein determining the farthest target coordinate point that the robot is allowed to reach when the robot walks along the currently traversed first azimuth by performing the coordinate axis rotation on all the second coordinate points based on the currently traversed first azimuth, comprises:
    generating third coordinate points corresponding to the second coordinate points respectively by performing the coordinate axis rotation on all the second coordinate points based on the currently traversed first azimuth; and
    determining the target coordinate point corresponding to the currently traversed first azimuth from the third coordinate points obtained after current rotation by taking a maximum lateral width of the robot as a constraint.

3. The method of claim 2, wherein determining the target coordinate point corresponding to the currently traversed first azimuth from the third coordinate points obtained after the current rotation by taking the maximum lateral width of the robot as the constraint, comprises:
    obtaining candidate third coordinate points whose absolute value of a first coordinate value is less than the maximum lateral width from the third coordinate points, wherein the first coordinate value is a coordinate value on a first coordinate axis; and
    selecting a coordinate point with a minimum second coordinate value from the candidate third coordinate points as the target coordinate point, wherein the second coordinate value is a coordinate value on a second coordinate axis.

4. The method of claim 1, further comprising:
    generating a navigation map based on the target coordinate point corresponding to each first azimuth.

5. The method of claim 1, wherein obtaining the target azimuth deviation of the robot based on the target coordinate point corresponding to each first azimuth, comprises:
    obtaining a first distance between the target coordinate point and a coordinate origin of the second coordinate system;

selecting target coordinate points whose first distance is greater than a width of a narrow passage as candidate target coordinate points;

obtaining a first target coordinate point and a second target coordinate point with a minimum first distance located on each side of the robot from the candidate target coordinate points; and determining the target azimuth deviation based on the first target coordinate point and the second target coordinate point.

6. The method of claim 5, wherein determining the target azimuth deviation based on the first target coordinate point and the second target coordinate point, comprises:

obtaining a second azimuth corresponding to the first target coordinate point and a second azimuth corresponding to the second target coordinate point; and obtaining an average value of the two second azimuths as the target azimuth deviation.

7. The method of claim 1, wherein controlling the robot to travel based on the target azimuth deviation, comprises:

obtaining a target motion azimuth by adjusting a motion azimuth of the robot based on the target azimuth deviation; and controlling the robot to travel based on the target motion azimuth.

8. An electronic device, comprising:

at least one processor; and a memory communicatively connected to the at least one processor; wherein the memory stores instructions executable by the at least one processor, and when the instructions are executed by the at least one processor, the at least one processor is caused to implement a robot traveling method operated in a scenario lacking positioning information, comprising:

detecting an obstacle, and obtaining first coordinate points of the detected obstacle in a first coordinate system, wherein the first coordinate system is a coordinate system of an obstacle detector, the obstacle detector is used for detecting whether there is an obstacle existing in the surroundings of the robot and guiding the robot to travel by avoiding obstacles;

obtaining second coordinate points of the obstacle in a second coordinate system by performing coordinate system transformation on the first coordinate points, wherein the second coordinate system is a coordinate system of a robot;

obtaining a first azimuth corresponding to each second coordinate point, traversing all the first azimuths, and determining a farthest target coordinate point that the robot is allowed to reach when the robot walks along a currently traversed first azimuth by performing coordinate axis rotation on all the second coordinate points based on the currently traversed first azimuth, wherein the farthest target coordinate point is a farthest coordinate point of contact with an obstacle that the robot is capable to reach along the first azimuth due to a limitation of a body of the robot; and obtaining a target azimuth deviation of the robot based on the target coordinate point corresponding to each first azimuth, and controlling the robot to travel based on the target azimuth deviation;

wherein obtaining the second coordinate points of the obstacle in the second coordinate system by performing the coordinate system transformation on the first coordinate points, comprises:

obtaining a position relation between a geometric center point of the obstacle detector and a geometric center point of the robot;

obtaining, based on the position relation, a first offset on the first coordinate axis and a second offset on the second coordinate axis of each first coordinate point; and for each of the first coordinate points, obtaining a second coordinate point by performing translation and transformation on the first coordinate point based on the first offset and the second offset.

9. The electronic device of claim 8, wherein determining the farthest target coordinate point that the robot is allowed to reach when the robot walks along the currently traversed first azimuth by performing the coordinate axis rotation on all the second coordinate points based on the currently traversed first azimuth, comprises:

generating third coordinate points corresponding to the second coordinate points respectively by performing the coordinate axis rotation on all the second coordinate points based on the currently traversed first azimuth; and determining the target coordinate point corresponding to the currently traversed first azimuth from the third coordinate points obtained after current rotation by taking a maximum lateral width of the robot as a constraint.

10. The electronic device of claim 9, wherein determining the target coordinate point corresponding to the currently traversed first azimuth from the third coordinate points obtained after the current rotation by taking the maximum lateral width of the robot as the constraint, comprises:

obtaining candidate third coordinate points whose absolute value of a first coordinate value is less than the maximum lateral width from the third coordinate points, wherein the first coordinate value is a coordinate value on a first coordinate axis; and selecting a coordinate point with a minimum second coordinate value from the candidate third coordinate points as the target coordinate point, wherein the second coordinate value is a coordinate value on a second coordinate axis.

11. The electronic device of claim 8, wherein the method further comprises:

generating a navigation map based on the target coordinate point corresponding to each first azimuth.

12. The electronic device of claim 8, wherein obtaining the target azimuth deviation of the robot based on the target coordinate point corresponding to each first azimuth, comprises:

obtaining a first distance between the target coordinate point and a coordinate origin of the second coordinate system;

selecting target coordinate points whose first distance is greater than a width of a narrow passage as candidate target coordinate points;

obtaining a first target coordinate point and a second target coordinate point with a minimum first distance located on each side of the robot from the candidate target coordinate points; and determining the target azimuth deviation based on the first target coordinate point and the second target coordinate point.

13. The electronic device of claim 12, wherein determining the target azimuth deviation based on the first target coordinate point and the second target coordinate point, comprises:

obtaining a second azimuth corresponding to the first target coordinate point and a second azimuth corresponding to the second target coordinate point; and obtaining an average value of the two second azimuths as the target azimuth deviation.

14. The electronic device of claim 8, wherein controlling the robot to travel based on the target azimuth deviation, comprises:

obtaining a target motion azimuth by adjusting a motion azimuth of the robot based on the target azimuth deviation; and controlling the robot to travel based on the target motion azimuth.

15. A non-transitory computer-readable storage medium having computer instructions stored thereon, wherein the computer instructions are configured to cause a computer to implement a robot traveling method operated in a scenario lacking positioning information, comprising:

detecting an obstacle, and obtaining first coordinate points of the detected obstacle in a first coordinate system, wherein the first coordinate system is a coordinate system of an obstacle detector, the obstacle detector is used for detecting whether there is an obstacle existing in the surroundings of the robot and guiding the robot to travel by avoiding obstacles;

obtaining second coordinate points of the obstacle in a second coordinate system by performing coordinate system transformation on the first coordinate points, wherein the second coordinate system is a coordinate system of a robot;

obtaining a first azimuth corresponding to each second coordinate point, traversing all the first azimuths, and determining a farthest target coordinate point that the robot is allowed to reach when the robot walks along a currently traversed first azimuth by performing coordinate axis rotation on all the second coordinate points based on the currently traversed first azimuth, wherein the farthest target coordinate point is a farthest coordinate point of contact with an obstacle that the robot is capable to reach along the first azimuth due to a limitation of a body of the robot; and obtaining a target azimuth deviation of the robot based on the target coordinate point corresponding to each first azimuth, and controlling the robot to travel based on the target azimuth deviation;

wherein obtaining the second coordinate points of the obstacle in the second coordinate system by performing the coordinate system transformation on the first coordinate points, comprises:

obtaining a position relation between a geometric center point of the obstacle detector and a geometric center point of the robot;

obtaining, based on the position relation, a first offset on the first coordinate axis and a second offset on the second coordinate axis of each first coordinate point; and for each of the first coordinate points, obtaining a second coordinate point by performing translation and transformation on the first coordinate point based on the first offset and the second offset.

16. The non-transitory computer-readable storage medium of claim 15, wherein determining the farthest target coordinate point that the robot is allowed to reach when the robot walks along the currently traversed first azimuth by performing the coordinate axis rotation on all the second coordinate points based on the currently traversed first azimuth, comprises:

generating third coordinate points corresponding to the second coordinate points respectively by performing the coordinate axis rotation on all the second coordinate points based on the currently traversed first azimuth; and determining the target coordinate point corresponding to the currently traversed first azimuth from the third coordinate points obtained after current rotation by taking a maximum lateral width of the robot as a constraint.

17. The non-transitory computer-readable storage medium of claim 16, wherein determining the target coordinate point corresponding to the currently traversed first azimuth from the third coordinate points obtained after the current rotation by taking the maximum lateral width of the robot as the constraint, comprises:

obtaining candidate third coordinate points whose absolute value of a first coordinate value is less than the maximum lateral width from the third coordinate points, wherein the first coordinate value is a coordinate value on a first coordinate axis; and selecting a coordinate point with a minimum second coordinate value from the candidate third coordinate points as the target coordinate point, wherein the second coordinate value is a coordinate value on a second coordinate axis.

18. The non-transitory computer-readable storage medium of claim 15, wherein the method further comprises:

generating a navigation map based on the target coordinate point corresponding to each first azimuth.

* * * * *